United States Patent Office 3,128,264
Patented Apr. 7, 1964

3,128,264
BLOCK COPOLYCARBONATES OF BISPHENOL A AND 4,4'-BIS(HYDROXYPHENYL) DIPHENYL METHANE
Thomas M. Laakso and David A. Buckley, Rochester, N.Y., assignors to Eastman Kodak Company, Rochester, N.Y., a corporation of New Jersey
No Drawing. Filed July 17, 1959, Ser. No. 827,693
2 Claims. (Cl. 260—42)

This invention relates to an improved polycarbonate of bisphenol A which is essentially composed of alternating blocks having structures composed of (I) recurring units from bisphenol A and (II) recurring units from 4,4'-bis(hydroxyphenyl)diphenylmethane wherein from about 15 to 85 mole percent (preferably 30 to 70 mole percent) of the recurring units are derived from bisphenol A. This invention also relates to a process for preparing these block copolymers. These block polymers are characterized by having high heat softening temperatures, a high Young's Modulus of elasticity and a high degree of flexibility. Useful photographic elements are also included in this invention wherein a film of the improved polycarbonate supports a coating of light-sensitive emulsion.

The preparation of polycarbonates of the general class with which this invention is concerned is well known in the art. A number of patents have been issued in the last few years describing polycarbonates prepared from bisphenol A and from various derivatives of bisphenol A. Among the prior art are various articles in the literature concerning this subject including an article by Schnell as to polycarbonates as a new group of plastics and the preparation and properties of aromatic polyesters of carbonic acid, Angewandte Chemie, 68: 633–660, No. 20, October 21, 1956.

An object of this invention is to provide an especially valuable improved polycarbonate derived from a substantial proportion of bisphenol A which has quite unusual properties which were unexpected in view of the prior art.

A further object of this invention is to provide a process for preparing such improved polycarbonates which are characterized by a block structure.

A further object of this invention is to provide photographic elements comprising a film support prepared from the improved polycarbonates provided by this invention and coated with a light-sensitive silver halide photographic emulsion.

Other objects will become apparent elsewhere herein.

According to a preferred embodiment of this invention there is provided an improved polycarbonate of bisphenol A consisting of a highly polymeric block copolymer having an inherent viscosity of from about 0.4 to about 3.5 essentially composed of alternating blocks having the structures:

I. Blocks composed of from about 3 to about 50 recurring units having the following Formula A:

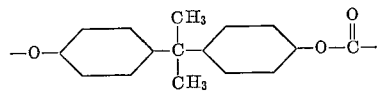

and

II. Blocks composed of about 3 to about 50 recurring units having the following Formula B:

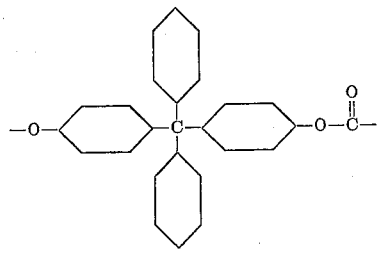

wherein from about 30 to 70 mole percent of said block copolymer is composed of said units having Formula A, said block copolymer being characterized by having a heat softening temperature in the range of from about 180°–240° C., having a Young's Modulus of elasticity for film which is at least substantially as great as for the homopolymers of units of Formula A and Formula B and at least about 28,000 kg./sq. cm., and having a flexibility measured by the MIT folds test at least about 2 times greater than for the homopolymer of units of Formula B and at least about 25.

Thus, this invention provides a highly useful series of high molecular weight block unit polymers having two different prepolymer blocks of units of a linear polycarbonate of 2,2-bis(4-hydroxyphenyl)propane usually called bisphenol A and a linear polycarbonate of 4,4'-bis(hydroxyphenyl)diphenylmethane. This series of block copolymers possesses to a surprisingly satisfactory degree the valuable properties of all of the blocks present in the polymer. This is considered an unobvious discovery for various reasons including the fact that neither of the individual high molecular weight homopolymers possess all of the properties achieved in accordance with this invention. The series of block copolymers encompassed by this invention have most unexpectedly high Young's moduli of elasticity, which property is a very important characteristic of any film to be used as a support for a photographic element.

The article mentioned above written by Schnell explains that the broad concept of such polycarbonates as are contemplated by this invention was known prior to the discoveries disclosed herein. Work in various places based upon the activities of workers in this art during the past half century has recently resulted in a preparation of commercial polycarbonate films derived from bisphenol A which is more specifically known as 2,2-bis(4-hydroxyphenol)propane. It appears that such bisphenol A polycarbonates are not only being commercially used for many of the purposes for which films in general are useful but that they are also being contemplated for certain rather severely limited utility as a photographic film support. Thus, the use of polycarbonates from bisphenol A as a photographic base is very seriously limited by the fact that the Young's Modulus of elasticity is only somewhere on the order of about 23,000 kg./sq. cm. This compares quite unfavorably with other commercially available film bases such as cellulose triacetate where the Young's Modulus lies in the range of 30,000–40,000. Another film base useful for photographic purposes is oriented polystyrene which has a Young's Modulus somewhere on the order of about 35,000 kg./sq. cm.

It is obvious that for a photographic film base to be a significant improvement over the prior art it should have some properties which render it substantially superior to cellulose triacetate which is generally recognized as the most commonly used satisfactory film base for photographic purposes. The tremendous number of characteristics and properties of photographic film bases is well known in the art relating to photography. The work in recent years in this art has tended toward the development of new base materials such as the general class of polyesters including polycarbonates, polyvinyl derivatives such as polystyrene, etc. A polyester such as polyethylene terephthalate is useful as a film base but cannot be solvent cast by the practicable techniques so carefully and thoroughly developed during the last few decades with regard to cellulose esters as film bases. Although polyvinyl derivatives such as polystyrene can be solvent cast, a film base prepared from polystyrene (even though it has been oriented) has a heat softening temperature on the order of only about 100° C. and therefore has rather limited utility. In contrast, a film base derived from cellulose triacetate has a heat softening temperature on the order of about 155° C.

The photographic film bases which can be solvent cast and which have been described in the prior art as of commercial value such as cellulose triacetate and polystyrene are considered to have flexibilities which are merely on the edge of being satisfactorily acceptable. Thus, cellulose triacetate has a flexibility as measured by the MIT folds test of about 25–35 folds. Polystyrene is somewhat better and has an average flexibility of about 50.

With the development of polycarbonate films such as can be derived from bisphenol A it became obvious that they had promise with regard to their use as photographic film bases provided that the Young's Modulus of elasticity could be improved upon. One polycarbonate mentioned by Schnell and by others which appeared to have some promise was that derived from 4,4'-bis(hydroxyphenyl)methylphenylmethane but this polycarbonate as a film only has a Young's Modulus of elasticity of about 28,600 kg./sq. cm. This value is of only minimal utility and approaches some of the lowest values ordinarily measured for cellulose triacetate film bases. Moreover, the flexibility of well cured films of this homopolymer was found to be quite low and of dubious value for commercial applications as a photographic film base. Another possibility which was considered by the inventors was the preparation of homopolymers of 4,4'-bis(hydroxy-phenyl)diphenylmethane but such homopolymers were of even less value as regards modulus and flexibility. Various studies as to the properties of random copolymers have not been promising as regards achieving any notable improvements in properties necessary for satisfactory utility as a photographic film support. Further work was also performed involving mixtures of homopolymers from bisphenol A. In doing this it was found that the Young's Modulus of the component having the highest modulus was significantly reduced although in some cases it still retained satisfactory value for marginal utility of limited use for certain photographic film purposes.

It was, therefore, quite surprising when it was found that block copolymers prepared in accordance with the invention described herein had a Young's Modulus substantially as great as for the homopolymer derived from either component and generally at least about 28,000 kg./sq. cm. It was even more surprising to find that these block copolymers had flexibility values measured by the MIT folds test of at least about twice as great as for the homopolymer of 4,4'-bis(hydroxyphenyl)diphenylmethane and at least about 25, which is substantially as good as cellulose triacetate film bases. Other tests disclosed that the polycarbonates contemplated by this invention had other properties and characteristics which rendered them quite useful as photographic film supports. Such other properties have been adequately described in the prior art with regard to polycarbonates of this general type.

Perhaps the most outstanding property of the polycarbonate film bases is the retention of the Young's Modulus of elasticity at much higher temperatures than in the case of film from cellulose triacetate, polystyrene in oriented form and polyethylene terephthalate in oriented form. Thus, the polycarbonate films produced in accordance with the present invention retain to a substantial degree their high modulus of elasticity at temperatures up to their heat softening temperatures, namely 180°–240° C. In contrast, the retention of Young's Modulus for polyethylene terephthalate begins to fall off very rapidly at temperatures of about 100° C. and becomes significantly less than the Young's Modulus for the polycarbonates of this invention at temperatures approaching 200° C. This factor also applies to film supports prepared from cellulose esters and polystyrene although the drop-off is not as pronounced as it is for polyethylene terephthalate. As a result, the polyesters of this inventtion have unusually valuable properties as photographic film supports at temperatures above 150° C.

Thus, according to this invention it has been found that by preparing block copolymers consisting of alternating sequences of polycarbonates derived from bisphenol A and 4,4'-bis(hydroxyphenyl)diphenylmethane (particularly 50 mole percent of each component), there is obtained a significant improvement in the substandard properties without sacrificing to any unacceptable degree the desirable values shown by the homopolymers. These block copolymers show physical properties quite different from the random copolymers prepared by conventional methods. That these block copolymers are not physical mixtures is shown by their different solubility characteristics in organic solvents.

This invention can be further illustrated by the following examples showing preferred embodiments although it will be understood that these embodiments are included merely for purposes of illustration and are not intended to limit the scope of the invention unless otherwise specifically indicated.

EXAMPLE A

*Preparation of Block Copolycarbonate of 50 Mole Percent Bisphenol A—50 Mole Percent 4,4'-Bis(Hydroxyphenyl)Diphenylmethane.*

Simultaneous preparation (see table of components below) of the two homopolymer blocks was employed. In two separate three-necked flasks equipped with a stirrer, a thermometer and a dropping-funnel were placed distilled water, sodium hydroxide and the bisphenol component. A clear solution was obtained and the flask was maintained at 15° C. or lower by means of an ice bath, then part of the methylene chloride was added with stirring and phosgene dissolved in cold, dry, distilled methylene chloride was added slowly within a period of 15 to 45 minutes, keeping the temperature below 15° C.

The contents in the two flasks were reacted for about the same periods of time and were combined at once and then the catalyst was added. The components used were as follows:

COMPONENT (A)

Bisphenol A _____ 22.8 g. (0.1 mole).
Sodium hydroxide _____ 11.2 g. (0.2 mole).
Phosgene in 50 ml. cold, dry distilled
  methylene chloride _____ 10.9 g. (0.11 mole).
Distilled water _____ 120 ml.
Distilled methylene chloride _____ 200 ml.

COMPONENT (B)

| | |
|---|---|
| 4,4'-bis(hydroxyphenyl)diphenyl methane | 35.2 g. (0.1 mole). |
| Sodium hydroxide | 11.2 g. (0.2 mole). |
| Phosgene in 50 ml. cold, dry, distilled methylene chloride | 10.9 g. (0.11 mole). |
| Distilled water | 300 ml. |
| Distilled methylene chloride | 300 ml. |

COMPONENT (C)

| | |
|---|---|
| Tri-n-butylamine | 1 ml. |

The above components (A) and (B) were run separately and simultaneously, combined, the tri-n-butylamine added, and allowed to polymerize. The polymerization was complete in 5 minutes, and the reaction was acidified with glacial acetic acid. After washing the viscous dope free of water-soluble materials, the polymer was precipitated from solution by pouring it into several volumes of methyl alcohol.

The yield of white fibrous copolycarbonate was 86 percent of the theoretical value and it had an inherent viscosity of 0.5 in chloroform.

A clear film cast from a methylene chloride solution of this block copolycarbonate had the following physical properties:

| | |
|---|---|
| Young's Modulus kg./cm.$^2$ | 2.95×10$^4$ |
| Yield and tensile kg./cm.$^2$ | 710 |
| Elongation | 5 |
| Folds | 40 |
| Tear | 45 |
| Heat distortion temperature, °C. | 191 |

Various runs were prepared as just described using other preparations of reactants. At the end of the separate runs the I.V. was about 0.1–0.2 in each case although a range of from 0.05 to 0.25 is also useful. At the beginning of the combined polymerization reactions the polymer solutions had rapid flow times of just a few seconds as measured from a standard pipette. After a few minutes of continuous stirring, the flow time of the combined reaction mixture had increased to from 50 up to several hundred seconds depending upon the time mixed and desired I.V. being sought. The polymerization was stopped by acidifying the reaction with glacial acetic acid. The methylene chloride layer was usually diluted with enough methylene chloride to allow more efficient stirring and water washing of the polymer solution free of soluble materials. The polymer was usually precipitated from methylene chloride solution by slowly pouring the viscous dope into methyl alcohol. After leaching in fresh methanol, the polymer was generally dried at 50° C. under reduced pressure.

The yield of white fibrous polymer was usually at least 85% of the theoretical value. These block copolymers had an inherent viscosity of from about 0.4 to about 3.5 as measured in chloroform. The I.V. can also be measured in 1:1 phenol and chlorobenzene solution.

Physical properties of these block copolymers were in the range as already described. See also the table of data presented below.

The unmodified 4,4'-bis(hydroxyphenyl)diphenylmethane homopolymer and the above mentioned 4,4'-bis(hydroxyphenyl)methylphenylmethane homopolymer can be prepared for comparative purposes by the following procedures:

EXAMPLE 1

*Homopolycarbonate From 4,4'-Bis(Hydroxyphenyl)-Methyl-Phenylmethane*

Twenty-five grams (0.086 mole) of 4,4'-bis(hydroxyphenyl)methylphenylmethane is dissolved in 9.6 g. (0.24 mole) of sodium hydroxide in 115 ml. of distilled water. This solution is cooled to 15° C. and 90 ml. of distilled methylene chloride is added. With good stirring a solution of 9.4 g. (0.095 mole) of phosgene in 50 ml. of dry distilled methylene chloride is added within a period of 15 minutes at such a rate that the temperature does not exceed 15° C. After the addition 1 ml. of tri-n-butylamine is added. Stirring is continued to a point where the viscosity of the lower methylene chloride layer has reached a flow time of 85 seconds through a standard pipette. Enough glacial acetic acid is then added to neutralize the alkali. The methylene chloride solution of the polymer is then washed free of salts so that it gives a clear film when coated on a glass plate. The polymer was isolated by carefully precipitating the polymer by pouring the viscous dope into 3 volumes of methyl alcohol.

The yield of white fibrous polycarbonate was 86 percent of the theoretical value and it had an inherent viscosity of 0.77 in chloroform.

A clear film cast from a methylene chloride solution of this polymer had the following physical properties:

| | |
|---|---|
| Young's Modulus kg.//cm.$^2$ | 2.86×10$^4$ |
| Yield and tensile kg./cm.$^2$ | 715 |
| Elongation percent | 5 |
| Folds | 22 |
| Tear | 67 |
| Heat distortion temperature, °C. | 184 |

EXAMPLE 2

*Polycarbonate From 4,4'-Bis(Hydroxyphenyl)Diphenyl-Methane*

Using the procedure of Example 1 the following materials were employed:

| | |
|---|---|
| 4,4'-bis(hydroxyphenyl)diphenylmethane | 35.2 g. (0.1 M.). |
| Sodium hydroxide | 11.2 g. (0.28 M.). |
| Phosgene in 50 ml. dry methylene chloride | 10.9 g. (0.11 M.). |
| Distilled water | 100 ml. |
| Distilled methylene chloride | 190 ml. |
| Tri-n-butylamine | 1 ml. |

Viscosity at time of acidification—65 seconds.

Viscosity determined in chloroform—0.57.

The film cast from methylene chloride solution had the following physical properties:

| | |
|---|---|
| Young's Modulus kg./cm.$^2$ | 2.80×10$^4$ |
| Yield and tensile kg./cm.$^2$ | 835 |
| Elongation percent | 7 |
| Tear | 8 to 10 |
| Folds | 12 |
| Heat distortion temperature, °C. | 200 |
| Melting point, °C. | 212 |

It can be seen that Folds values (flexibility by the MIT folds test) are less than satisfactory and that Young's Modulus values are of only minimal values for these polycarbonates as set forth in comparative Examples 1 and 2.

For comparative purposes the following describes the preparation of other block copolycarbonates employing tetrachlorobisphenol A in lieu of the bisphenol A:

EXAMPLE 3

*Block Copolycarbonate From Tetrachloro-Bisphenol A and 4,4'-Bis(Hydroxyphenyl)Diphenylmethane (72:25 Mole Percent)*

Using the procedure of Example 1 the following materials were employed to prepare the prepolymers:

COMPONENT A

| | |
|---|---|
| Tetrachloro-bisphenol A | 94.4 g. (0.258 mole). |
| Sodium hydroxide | 28.8 g. (0.72 mole). |
| Phosgene in 50 ml. cold, dry, distilled methylene chloride | 28.2 g. (0.284 mole). |
| Distilled water | 512 ml. |
| Distilled methylene chloride | 258 ml. |

COMPONENT B

| | |
|---|---|
| 4,4'-bis(hydroxyphenyl)disphenylmethane | 30.27 g. (0.086 mole). |
| Sodium hydroxide | 9.6 g. (0.72 mole). |
| Phosgene in 50 ml. cold, dry, distilled methylene chloride | 9.4 g. (0.095 mole). |
| Distilled water | 105 ml. |
| Distilled methylene chloride | 90 ml. |

COMPONENT C

| | |
|---|---|
| Tri-n-butylamine | 1 ml. |

The above components A and B were run separately and simultaneously, combined, the tri-n-butylamine added, and allowed to polymerize. During the polymerization 300 ml. additional methylene chloride was added to dilute the viscous solution. After 45 minutes' polymerization time, the reaction was acidified with glacial acetic acid, washed free of water-soluble materials and the polymer precipitated from solution by pouring the viscous dope into several volumes of methyl alcohol.

The yield of white fibrous copolycarbonate was 87% of the theoretical value and it had an inherent viscosity of 0.94 in chloroform.

A clear film cast from a methylene chloride solution of this block copolycarbonate had the following physical properties:

| | |
|---|---|
| Young's Modulus _____ kg./cm.$^2$__ | $2.95 \times 10^4$ |
| Yield and tensile _____ kg./cm.$^2$__ | 700 |
| Elongation _____ percent__ | 3 |
| Tear _____ | 50 |
| Folds _____ | 10 |
| Heat distortion temperature, °C. _____ | 212 |

EXAMPLE 4

*Block Copolycarbonate From Tetrachloro-Bisphenol A and 4,4' - Bis-(Hydroxyphenyl)Methylphenylmethane (75:25 Mole) Percent*

Using the procedure of Example 3 the following materials were employed to prepare the prepolymers:

COMPONENT A

| | |
|---|---|
| Tetrachloro-bisphenol A_____ | 94.4 g. (0.258 mole). |
| Sodium hydroxide_____ | 28.8 g. (0.72 mole). |
| Phosgene in 50 ml. cold, dry distilled methylene chloride_____ | 28.2 g. (0.284 mole). |
| Distilled water_____ | 385 ml. |
| Distilled methylene chloride_____ | 258 ml. |

COMPONENT B

| | |
|---|---|
| 4,4'-bis(hydroxyphenyl)methylphenylmethane _____ | 25.0 g. (0.086 mole). |
| Sodium hydroxide_____ | 9.6 g. (0.24 mole). |
| Phosgene in 50 ml. cold, dry distilled methylene chloride_____ | 9.4 g. (0.095 mole). |
| Distilled water_____ | 105 ml. |
| Distilled methylene chloride_____ | 90 ml. |

COMPONENT C

| | |
|---|---|
| Tri-n-butylamine _____ ml__ | 1 |

The above reaction A and B were run separately and simultaneously, combined, the tri-n-butylamine added, and allowed to polymerize. During the polymerization time (40 minutes) the viscosity of the reaction mixture increased until it became a viscous dough. Glacial acetic acid was added to neutralize the excess alkali and the dope was diluted with 300 ml. methylene chloride. After washing with water to remove all water-soluble materials, the polymer was precipitated from solution by pouring the viscous dope into several volumes of methyl alcohol.

The yield of white fibrous copolycarbonate was 95% of the theoretical value and it had an inherent viscosity of 0.8 in chloroform.

A clear film cast from a methylene chloride solution of this block copolycarbonate had the following physical properties:

| | |
|---|---|
| Young's Modulus _____ kg./cm.$^2$__ | $2.9 \times 10^4$ |
| Yield and tensile _____ kg./cm.$^2$__ | 776 |
| Elongation _____ percent__ | 4 to 5 |
| Tear _____ | 30 |
| Folds _____ | 20 |
| Heat distortion temperature, °C. _____ | 174 |

The results set forth in comparative Examples 3 and 4 are not much different than in the case of comparative Examples 1 and 2 even though the homopolymer of tetrachloro bisphenol A has a Young's Modulus of about 30,000 kg./sq. cm. The values for flexibility are clearly less than satisfactory.

Another homopolycarbonate somewhat analogous to that described in comparative Example 1 is as follows:

EXAMPLE 5

*Polycarbonate From 4,4'-Bis(Hydroxyphenyl)Methyl-2-Naphthyl Methane*

Using the procedure of Example 1 the following materials were employed:

| | |
|---|---|
| 4,4'-bis(hydroxyphenyl)methyl-2-naphthyl methane_____ | 34.2 g. (0.1 mole). |
| Sodium hydroxide_____ | 11.2 g. (0.28 mole). |
| Phosgene in 50 ml. cold, dry, distilled methylene chloride_____ | 10.9 g. (0.11 mole). |
| Distilled water_____ | 120 ml. |
| Distilled methylene chloride_____ | 200 ml. |
| Tri-n-butylamine _____ | 1 ml. |

The polymerization was acidified with glacial acetic acid 5 minutes after the catalyst was added.

Viscosity determined in chloroform=1.10.

The clear film cast from methylene chloride solution had the following physical properties:

| | |
|---|---|
| Young's Modulus _____ kg./cm.$^2$__ | $2.41 \times 10^4$ |
| Yield and tensile _____ kg./cm.$^2$__ | 615 |
| Elongation _____ percent__ | 6 |
| Tear _____ | 100 |
| Folds _____ | 100 |
| Heat distortion temperature, °C. _____ | 188 |

It can be seen that this homopolymer is not significantly different from the homopolymer of bisphenol A. Another block copolymer of interest for comparative purposes is as follows:

EXAMPLE 6

*Block Copolycarbonate From Bisphenol A and 4,4'-Bis(Hydroxyphenyl)-9,9-Fluorene (75:22 Mole Percent)*

Using the procedure of Example 3 the following materials were employed to prepare the prepolymers:

COMPONENT A

| | |
|---|---|
| Bisphenol A_____ | 22.8 g. (0.1 mole). |
| Sodium hydroxide_____ | 11.2 g. (0.28 mole). |
| Phosgene in 50 ml. cold, dry distilled methylene chloride_____ | 10.9 g. (0.11 mole). |
| Distilled water_____ | 120 ml. |
| Distilled methylene chloride_____ | 120 ml. |

COMPONENT B

| | |
|---|---|
| 4,4'-bis(hydroxyphenyl)-9,9-fluorene _ | 35.72 g. (0.1 mole). |
| Sodium hydroxide_____ | 11.2 g. (0.28 mole). |
| Phosgene in 50 ml. cold, dry distilled methylene chloride_____ | 10.9 g. (0.11 mole). |
| Distilled water_____ | 350 ml. |
| Distilled methylene chloride_____ | 350 ml. |

COMPONENT C

| | |
|---|---|
| Tri-n-butylamine _____ ml__ | 1 |

The above reactions A and B were run separately and simultaneously, combined, the tri-n-butylamine added, and allowed to polymerize. After 15 minutes enough glacial acetic acid was added to neutralize the alkali and the viscous dope washed free of water-soluble materials. The polymer was precipitated from solution by pouring the viscous dope into several volumes of methyl alcohol.

The yield of white fibrous copolycarbonate was 90 percent of the theoretical value and it had an inherent viscosity of 0.9 in chloroform.

A clear film cast from a methylene chloride solution of this block copolycarbonate had the following physical properties:

| | |
|---|---|
| Young's Modulus _____ kg./cm.$^2$__ | $2.41 \times 10^4$ |
| Yield and tensile _____ kg./cm.$^2$__ | 550 |
| Elongation _____ percent__ | 11 |
| Tear _____ | 50 |
| Folds _____ | 65 |
| Heat distortion temperature, °C. _____ | 200 |

This latter block copolymer and all of the other polymers described in the comparative examples clearly emphasize the empirical nature of the art and the unexpected and unobvious nature of the invention covered by Example A.

Varoius polymers were prepared following the techniques described above using variations in the prescribed conditions and materials so as to obtain the data such as set forth in the following table. This data shows the value of various properties of solvent cast polycarbonate and comparative films approximately 0.005 inch thick. The values for the comparative films of cellulose triacetate and polystyrene are included in the table since their relationship to the improvement covered by this invention has been discussed hereinabove.

The preparation of film from these various polycarbonate polymers was generally accomplished using methylene chloride as the solvent in proportions such as 4 parts of solvent to 1 part of polymer or other suitable proportions to obtain a dope. The data was generally prepared by the machine coating technique employing a conventional coating machine having a dope hopper from which the dope is flowed onto a highly polished coating wheel from which it is stripped and cured as it passed through drying chambers. Of course, hand coating techniques can also be employed using apparatus wherein a coating knife with a vertically adjustable blade is used to manually spread the dope on a glass plate; the plate is put in an oven and dried for an extended period of time such as 18 hours at about 70° F. Although methylene chloride was generally employed, other solvents can also be used (e.g. other halogenated hydrocarbons) for the preparation of a solution or dope of the polymer so that it can be solvent cast or coated as described. Although the films tested in the table were not necessarily exactly 5 mils thick, the data set forth was adjusted acccordingly so as to be properly comparable.

In this table the polycarbonates are considered as derived from bisphenols which are coded according to the following Definition List:

2,2-bis(4-hydroxyphenyl)propane _____ BPA
2,2 - bis(3,5 - dichloro - 4 - hydroxyphenyl)propane _____ TCBPA
4,4'-bis(hydroxyphenyl)methylphenylmethane__ MPM
4,4'-bis(hydroxyphenyl)diphenylmethane _____ PPM
4,4'-bis(hydroxyphenyl-9,9-fluorene _____ 99F The film supports for photographic purposes contemplated by this invention can be coated with photographic emulsions so as to form a photographic element having unusually valuable properties. The coating of film bases with photographic emulsions is well known in the art and is described in numerous patents and publications such as in a paper by Trivelli and Smith, The Photographic Journal, vol. 79, pages 330–338, 1939. Emulsions such as those described by Trivelli et al. can be readily coated upon the surface of the film base encompassed by this invention using standard coating techniques.

A photographic element was prepared by coating such an emulsion as described by Trivelli and Smith upon the film base described in Example A.

In a container with temperature control was put a solution with the following composition:

(A)

| | |
|---|---|
| Potassium bromide | gm__ 165 |
| Potassium iodide | gm__ 5 |
| Gelatin | gm__ 65 |
| Water | cc__ 1700 |

And in another container was put a filtered solution consisting of:

(B)

| | |
|---|---|
| Silver nitrate | gm__ 200 |
| Water | cc__ 2000 |

Solution A was kept at a temperature of 70° C. during precipitation and ripening, while solution B was put in a separating funnel at a temperature of 72° C. The silver nitrate solution ran from the separating funnel through a calibrated nozzle into the container, the contents of which were kept in constant motion during precipitation and ripening, and later, during finishing, by a mechanical stirrer.

After the precipitation, the emulsions were ripened for 20 minutes at the temperature of precipitation (70° C.). Then, they were cooled as quickly as possible to 45° C., and at this temperature 250 gm. of washed gelatin were added to each emulsion. The emulsions were stirred for 20 minutes at 45° C. in order to dissolve this gelatin. After standing overnight in a cold storage room, the emulsions were shredded and washed. They were then melted in the container at a temperature of 42° C. The weight of each of the emulsions was brought to 6.3 kg. (14 lbs.) by adding 100 gm. of gelatin soaked in the required amount of distilled water. Finishing was accomplished in 30 minutes, at a temperature of 60° C.

PROPERTIES OF SOLVENT CAST POLYCARBONATE AND OTHER COMPARATIVE FILMS APPROXIMATELY 0.005 INCH THICK

| | Mole Percent—See Definition List | | | | | | Young's Modulus ($10^4$ kg./cm.) | | Flexibility (MIT Folds) | | Heat Softening or Distortion Temperature (° C.) | |
|---|---|---|---|---|---|---|---|---|---|---|---|---|
| | BPA | PPM | MPM | TCBPA | MNM | 99F | Random | Block | Random | Block | Random | Block |
| a | 100 | | | | | | 2.3 | | 148 | | 157 | |
| b | | | | | | 100 | 2.4 | | 100 | | 188 | |
| c | 75 | | | | | 25 | | 2.41 | | 65 | | 200 |
| d | 80 | | | 20 | | | 2.3 | | 62 | | 154 | |
| e | 75 | | | 25 | | | | 2.5 | | 85 | | 165 |
| f | 70 | | | 30 | | | 2.3 | | | 47 | | 150 | |
| g | 50 | 50 | | 0 | | | | 2.95 | | 40 | | 191 |
| h | 50 | | | 50 | | | 2.9 | 3.0 | 18 | 30 | 159 | 140 |
| i | 30 | | | 70 | | | 2.9 | | 10 | | 172 | |
| j | | | 25 | 75 | | | | 2.9 | | 20 | | 174 |
| k | ¹25 | | | 75 | | | | ¹3.0 | | ¹70 | | ¹220–240 |
| l | | 25 | | 75 | | | | 2.95 | | 10 | | 212 |
| m | 20 | | | 80 | | | 2.9 | | 13 | | 200 | |
| n | | 100 | | | | | 2.8 | | 12 | | >200 | |
| o | | | | | 100 | | 3.0 | | 16 | | 220–240 | |
| p | | | | 100 | | | 2.9 | | 22 | | 184 | |
| Cellulose Triacetate | | | | | | | 3.0–4.0 | | 25–35 | | 155 | |
| Polystyrene (oriented) | | | | | | | 3.5 | | 50 | | 100 | |

¹ Covered by Laakso and Buckley application Serial No. 815,273, filed May 25, 1959.

The photographic elements prepared as described were exposed to light and tested to determine their characteristics and found to behave satisfactorily in all regards and to have exceptionally advantageous properties at temperatures in excess of 150° C., a quite satisfactorily high degree of flexibility, and a Young's Modulus of elasticity adequate for normal photographic purposes, especially when a suitable pelloid was applied to the back of the support. If desired the silver halide emulsion can be coated upon a subbing which is first applied to the film support and may be composed of a suitable gelatin composition or a terpolymer latex as described in the prior art, e.g. a latex of an acrylic ester, a vinyl or vinylidene halide and an unsaturated acid such as acrylic acid or itaconic acid, cf. U.S. 2,570,478. See also British Patent No. 808,629.

In the data presented herein the flexibility test was performed and the values recorded as to well cured film having a minimal retention of solvent since solvent retention in recently made film may give unrealistic values as to flexibility. The MIT folds test was performed using an MIT folding endurance tester made by Tinius Olsen; the technique employed is that originally designed some years ago for testing the flexibility of paper and now generally recognized as applicable to sheets of synthetic resins, viz. ASTM Method D 643–43.

The block copolyesters as described are also useful as sheet packaging materials, adhesive tape bases, kinescope recording tape, dielectrics for condensers, insulators, etc. They have high melting points and are tough, elastic, tear resistant, resilient and are endowed with good electrical properties under various conditions including moist humid air in the tropics, air frictional heat in the nose cones of rockets or missiles, carbon arc motion picture projection, etc.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. An improved polycarbonate of 2,2-bis(4-hydroxyphenyl)propane consisting of a highly polymeric block copolymer having an inherent viscosity of from about 0.4 to about 3.5 essentially composed of alternating blocks having the structures:

I. Blocks characterized in that these blocks as an independent polymer would have an inherent viscosity of at least 0.05 measured in chloroform and be composed of from about 3 to about 50 recurring units having the following Formula A:

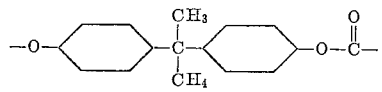

and

II. Blocks characterized in that these blocks as an independent polymer would have an inherent viscosity of at least 0.05 measured in chloroform and be composed of about 3 to about 50 recurring units having the following Formula B:

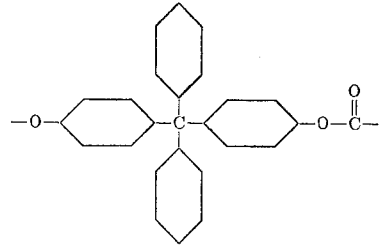

wherein from about 30 to 70 mole percent of said block copolymer is composed of said units having Formula A, said block copolymer being characterized by having a heat softening temperature in the range of from about 180°–240° C., having a Young's Modulus of elasticity for film which is at least substantially as great as for the homopolymers of units of Formula A and Formula B and at least about 28,000 kg./sq. cm., and having a flexibility measured by the MIT folds test at least about 2 times greater than for the homopolymer of units of Formula B and at least about 25.

2. An improved film of a polycarbonate as defined by claim 1 wherein the mole percent of said block copolymer composed of said units having Formula A is 50%, said block copolymer being particularly characterized by having a heat softening temperature of at least about 190° C., having a Young's Modulus of elasticity of about 29,500 kg./sq. cm. and having a flexibility measured by the MIT folds test on the order of about 40.

References Cited in the file of this patent
UNITED STATES PATENTS

| | | |
|---|---|---|
| 2,698,241 | Saner | Dec. 28, 1954 |
| 2,799,666 | Caldwell | July 16, 1957 |
| 2,843,567 | Williams et al. | July 15, 1958 |
| 2,874,046 | Klockgether et al. | Feb. 17, 1959 |
| 2,970,131 | Moyer | Jan. 31, 1961 |

FOREIGN PATENTS

| | | |
|---|---|---|
| 578,585 | Canada | June 30, 1959 |

OTHER REFERENCES

Schnell: Ind. Eng. Chem., 51, 157–160 (February 1959).

UNITED STATES PATENT OFFICE
CERTIFICATE OF CORRECTION

Patent No. 3,128,264                                         April 7, 1964

Thomas M. Laakso et al.

It is hereby certified that error appears in the above numbered patent requiring correction and that the said Letters Patent should read as corrected below.

Column 11, lines 45 to 48, for that portion of the formula reading

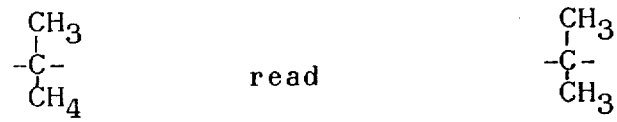

Signed and sealed this 18th day of August 1964.

(SEAL)
Attest:

ERNEST W. SWIDER                                      EDWARD J. BRENNER
Attesting Officer                                          Commissioner of Patents